May 26, 1936.  A. MAURER  2,042,069
RESILIENT COUPLING
Filed Feb. 15, 1933  3 Sheets-Sheet 1

Inventor
Albrecht Maurer
by C. P. Goepel
his attorney

May 26, 1936.  A. MAURER  2,042,069

RESILIENT COUPLING

Filed Feb. 15, 1933  3 Sheets-Sheet 2

May 26, 1936.　　　A. MAURER　　　2,042,069
RESILIENT COUPLING
Filed Feb. 15, 1933　　　3 Sheets-Sheet 3

Inventor
Albrecht Maurer
by C. P. Goepel
his attorney

Patented May 26, 1936

2,042,069

UNITED STATES PATENT OFFICE 2,042,069

RESILIENT COUPLING

Albrecht Maurer, Bad Hamburg v. d. Hohe, Germany, assignor to American Voith Contact Company, Inc., New York, N. Y., a corporation of New York Application February 15, 1933, Serial No. 656,773
In Germany February 20, 1932

10 Claims. (Cl. 64—15)

In most resilient all-metal couplings, the driving and the driven member are coupled with each other by springs subject to bending, tension or compression. It has been tried to avoid the disadvantages with regard to size, weight and cost inherent to such couplings by using as coupling elements, bars or rods subject to torsion only. Thus a more efficient utilization of the material and consequently less cost for materials are obtained and couplings of this type will result smaller, lighter and cheaper. Furthermore the coupling elements subject to torsion can accurately and reliably be calculated for any load.

A serious inconvenience, however, consists in the fact, that it is extremely difficult to transmit the peripherical forces to the bars in such a way, that the latter are subject to torsion only and remain free from any bending stresses. In the known couplings with straight bar springs the two ends of the springs are far apart. Each bar spring is guided in one coupling-half at two supporting points and engages in the other coupling-half with one or two crank arms disposed at right angles to the spring. The crank arms are formed either by bending the ends of the bar springs at right angles or by mounting separate crank arms thereon. In either case various disadvantages arise.

The bearings of the bar springs require space, make the coupling more expensive, and take away from the springs the possibility of mutually adapting themselves to changes of position in the coupling shafts by resilient yielding. The ends of the cranks, therefore, have to be made spherical in shape in order to give them the necessary adjustability. With this is connected the disadvantage that the transmission of force is only effected in small point-like surface, in which large pressures occur, which lead to undue and premature wear. The equipping of the bar springs with special cranks furthermore makes the couplings considerably more complicated and more expensive.

According to the present invention all the disadvantages are obviated by constructing the torsionally stressed coupling elements as stirrup-shaped springs substantially in the form of an open loop, the ends of which each engage in one of the respective coupling halves or complemental coupling members. Such stirrup-shaped springs are already known and employed in couplings as so-called C-springs. In the known couplings, however, they are only subjected to bending stresses, but are never employed as torsion springs.

The employment of stirrup-shaped torsion springs has above all the advantage that the ends of the springs can be arranged close together. Axial forces and injurious clamping moments are thereby easily avoided. Even if the ends of the springs are located closely together the movability of the two shaft ends, both in a radial and in an axial direction, is sufficient, and the slipping movements occurring in the case of such shaft displacements remain small, so that practically no wear occurs. The stirrup-shaped springs may be placed close together in axial planes upon the whole periphery of the coupling, so that the couplings are very small, and are of exceedingly great working capacity in proportion to their weight. It is, however, also possible to arrange the springs obliquely. The supporting of the springs is very simple. Their ends may be clamped firmly, so that they cannot rotate in the supports, but it is also possible for them to be rotatable in their bearings. Even under load the ends of the springs remain axial and parallel. The contact between the end part of the springs and their supports remains unaltered, so that there is no point contact or line contact but always surface contact; the pressures, therefore, remain low.

For the purpose of obtaining the best utilization of the weight of the spring, the shape of the spring may advantageously be so determined, that the stresses in the material are the same in as large a portion as possible of each spring. This can be attained, in forged or cast springs, by suitable grading of the cross section of the material. In particular it is advantageous to design the spring as a beam of uniform strength. In springs of constant cross section the requirement of equal stress of the material on all points is fulfilled by movably supporting the ends of the springs to which the coupling halves are attached and by locating them at the centre of curvature of the spring stirrup. Arrangements with rotatably supported spring ends have particularly good damping effect against oscillations owing to the friction that occurs with the torque. For the same purpose stops may also be provided. If in the case of stronger oscillations the springs strike against the stops, the oscillations are disturbed and damped out. These stops may at the same time serve the purpose of protecting the springs against overloads. From the moment at which the springs bear against the stops the coupling acts as a rigid coupling.

If the ends of the springs are tightly clamped so that they cannot rotate, the most advantageous shape for the springs of constant cross section of the material, is that of a circular ring open at one point. For these conditions it may be advantageous to make all the spring stirrups out of one piece, in such a way that the spring stirrups are each continuous and connect at each end with the adjacent spring stirrup.

There are many possibilities for the arrangement of the spring stirrup. A particularly simple form for the two coupling flanges is obtained if the spring stirrups engage round the coupling flanges. This arrangement, however, requires in most cases a special protective casing for the spring stirrups. In arrangements with coupling flanges of shell-like or cup-like construction, whereby the shell-like cups protect the ends of the springs, a special protective casing is superfluous. The spring stirrups require particularly little space if they are arranged in axial planes round the shaft.

According to the invention it is immaterial in what manner the stirrup springs are secured in the two coupling halves. A satisfactory engagement can be obtained either in grooves or in holes. For the assembling it is convenient to hold the springs, at least in one coupling half, in bores or grooves parallel to the axis. The coupling can then be brought into or out of engagement by a simple axial displacement of one coupling flange.

In the simplest and best forms of spring, the ends of the springs are located close together in the periphery or within the spring stirrup. Here the assembling causes difficulties, particularly when hard springs and a connection of the spring ends with the coupling members with as little clearance as possible are desired. In this case supporting of the spring ends in grooves or slots is inevitable. A tight grip can be obtained without impairing the resilient capacity, if the springs are made thinner in the neighbourhood of the ends than at the ends themselves, or if the ends of the springs are thickened by mounting guiding pieces thereon. In this case the slots in the coupling flanges must be provided with a narrow open end corresponding to the thinner portion of the spring, and, towards the interior, with expansions corresponding to the thickened spring ends.

It has also been found very advantageous to bend the coupling elements in such a way, that their ends do not lie in the same plane, but in two different parallel planes. The stirrup-spring is, in this case, bent to a screw-like shape. Conveniently the distance between the two planes of the spring-ends corresponds to the pitch of the supporting-slots or bores in the coupling flanges. One spring-end is then introduced into a slot or bore of one coupling flange, while the other end does not engage with the opposite slot or bore of the second coupling half, but with the next one.

Various constructional forms of the invention are illustrated by way of example in the accompanying drawings, in which Figures 1 and 2 show one constructional form in elevation and in section parallel to the axis of the coupled shafts respectively, while Figures 3 and 4, 5 and 6, 7 and 8, 9 and 10, 12 and 13, show sections at right angles and parallel to the axes of the coupled shafts of other constructional forms.

Figure 1:
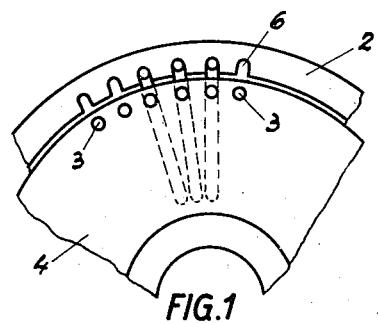
Figure 2:
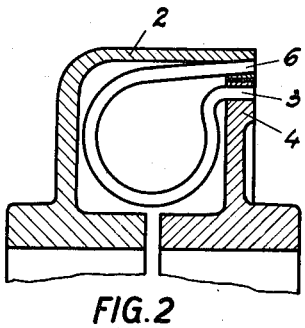

In the constructional form illustrated in Figures 1 and 2 the stirrup-shaped springs 1 are located within a cup-shaped coupling flange 2, the outer rim of which is provided with grooves 6, into which one end of the stirrup spring engages. The other end of the stirrup spring is supported in bores 3 in the flange 4 of the other half of the coupling.

Figure 3:
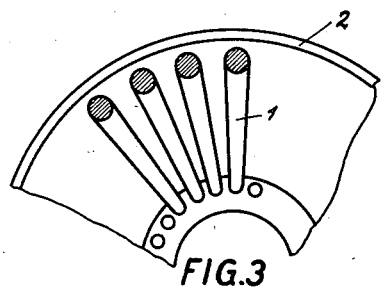
Figure 4:
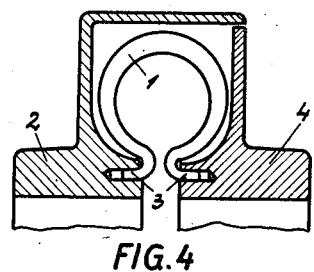

In the constructional form of coupling shown in Figures 3 and 4, the springs 1 are made of varying cross section for the purpose of uniformly stressing same throughout the entire length corresponding to the forces prevailing at each point of the spring. Their ends are located in bores 3, parallel to the axis, in the coupling flanges 2 and 4.

Figure 5:
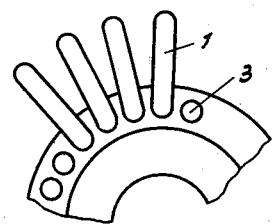
Figure 6:
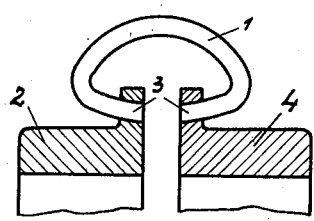
Figure 7:
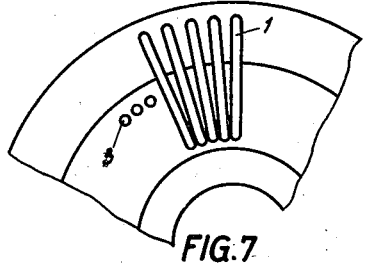
Figure 8:
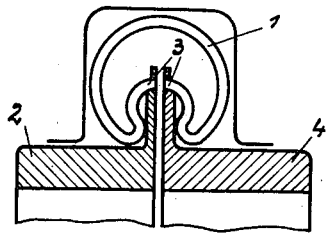

While the ends of the springs in the last mentioned constructional form are directed away from one another, Figures 5 and 6 show a coupling in which the springs 1 engage round the two coupling flanges 2 and 4, and the ends of the springs are directed towards one another. They are held in both flanges in bores 3 parallel to the axis. One disadvantage of this construction is that the ends of the springs are comparatively far apart. This may be remedied by the construction shown in Figures 7 and 8, in which the flanges have an external recess reaching from the outer face to the centres of the holes 3. By this arrangement the clearance between two spring ends, necessary for the introduction of the spring, is reduced to a minimum. At the same time Figure 8 shows a specially resilient form of the springs 1. These are almost circular rings, the ends of which are bent inwards in such a way that they are located at the centre.

Figure 9:
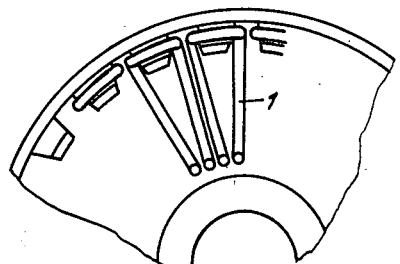
Figure 10:
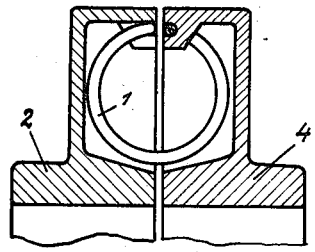
Figure 11:
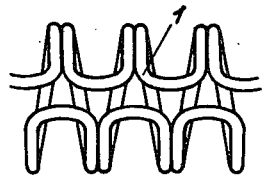
Figure 11 shows a detail.

Figures 9, 10 and 11 show an arrangement of the springs with firmly clamped ends. In these cases the springs are preferably of circular ring shape. The construction of the springs according to Figure 11 is particularly noteworthy, inasmuch as this figure shows how all the stirrup springs 1 can be made in one single piece. The ring springs are supported in grooves in the symmetrically constructed coupling flanges 2 and 4, which permit of a simple engagement and disengagement of the coupling by axial displacement of one coupling flange.

Figure 12:
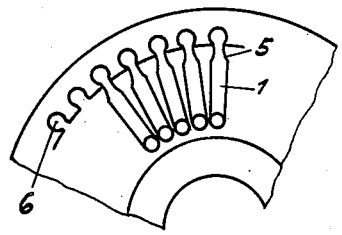
Figure 13:
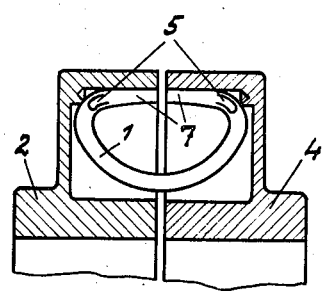

In the form of construction according to Figures 12 and 13, the spring 1 is constructed as a simple stirrup. The springs are laterally flattened at 5, so that they can be introduced without difficulty into cylindrically machined slots 6 in the two coupling halves 2 and 4. The thickened ends 7 of the springs are of exactly the same diameter as the cylindrical grooves 6.

Figure 14:
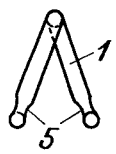
Figures 14 and 15 show a front view and side view of a coupling element bent in such a way, that its ends lie in two different parallel planes.
Figure 15:
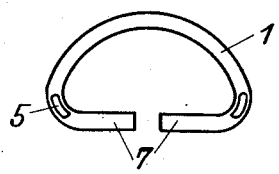
Figure 16:
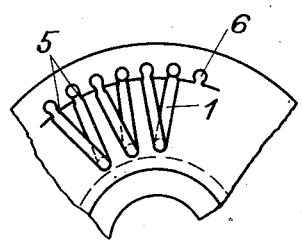
Figures 16 and 17 show elevation and section parallel to the axis of a coupling with springs according to Figures 14 and 15.
Figure 17:
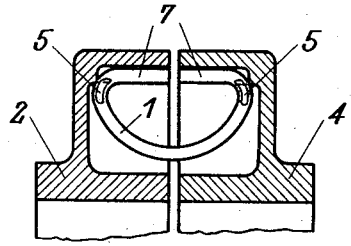
Figure 18:
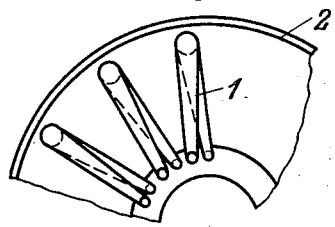
Figures 18 and 19 show elevation and section parallel to the axis of a similar coupling with circular stirrup-springs.
Figure 19:
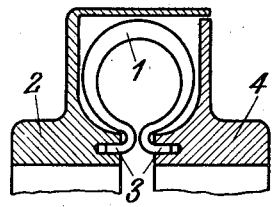

As Figure 14 shows the stirrup-springs can be bent in such a way that their ends 7 will be separated by a distance which is more than the thickness of the material at the spring ends. This distance depends upon the resistance of the material between the supporting slots, as this material shall not be allowed to break out. As shown in Figure 16 one spring end is supported in one slot 6 of coupling flange 2 while the other spring end engages with the next slot of the second coupling flange 4. The springs are laterally flattened at 5 so as to be easily introduced into the slots 6 of the coupling flanges 2 and 4. In a coupling according to Figs. 18 and 19 with circular springs 1, the ends 3 of which are bent in opposite directions, the same arrangement may be applied. The ends do not engage in opposite holes but in one hole in one coupling half and in the next hole on the other coupling half. In order to make Figs. 16 and 18 more distinct, the spring stirrups located between two of the shown spring stirrups, have been omitted.

Figure 20:
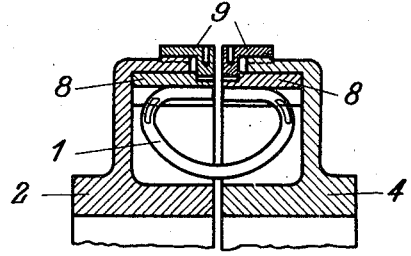
Figure 20 shows a section parallel to the axis of a coupling.

In order to be able to use a hard material for the support of the spring stirrups and to facilitate assembling, one or both coupling flanges can be equipped with a sleeve 8, as shown in Figure 20. Into these sleeves 8 are machined the slots or bores 6 supporting the springs. When the stirrups have been set into the sleeves 8, the latter are clamped to the coupling flanges 2 and 4 by means of cap-nuts 9.

Stirrup springs bent as just described have the advantage that they can be manufactured by winding. Furthermore tilting as in the case of plane springs is impossible.

Having now particularly described and ascertained the nature of my said invention and in what manner the same is to be performed, I declare that what I claim is:—

1. A resilient coupling comprising coupling halves provided with recesses parallel to the axis of said coupling halves, a resilient coupling element constructed substantially in the form of an open loop and having a circular cross section, the ends of said coupling element being aligned and movably engaging the recesses.

2. A resilient coupling comprising complemental coupling members provided with recesses parallel to the axis of said members, a resilient coupling element constructed substantially in the form of an open loop having a circular cross section, the terminal portions of said element being directed outwardly away from one another and disposed in substantial alignment and movably engaging the recesses.

3. A resilient coupling comprising complemental coupling members provided with recesses for receiving the terminal portions of resilient coupling elements, and a plurality of resilient coupling elements each in the form of an open loop of circular cross section and having terminal portions reversely bent in opposite directions adjacent said loop openings and movably engaging in said recesses.

4. A resilient coupling element constructed substantially in the form of an open resilient loop having a circular cross section provided with terminal portions, said terminal portions being substantially straight and disposed in substantial alignment with each other, and also of circular cross section and adapted for rotary movement in the supports in which they may be placed.

5. A resilient coupling element comprising a body portion in the form of an open loop having a circular cross section of resilient material and provided with straight terminal portions turned outwardly in opposite directions and disposed in substantial alignment, also of circular cross section and adapted for rotary movement in the supports in which they may be placed.

6. A resilient coupling member comprising a body portion in the form of an open substantially circular loop, provided with straight terminal portions disposed in alignment with each other and in substantial tangency to the circular loop portion.

7. A resilient coupling comprising a pair of complemental coupling members each being provided with means for anchoring a plurality of resilient coupling elements, and a plurality of resilient coupling elements each in the form of an open loop, all of said loops being formed from a continuous strand of resilient material, and means connecting the separate loop formations and engaging the anchoring means of the coupling member to maintain the same in driving relationship.

8. A resilient shaft coupling comprising coupling halves, a resilient coupling member having a loop-shaped portion and opposed portions disposed close together and parallel to its axis and to each other in all operative positions, and means for rotatably securing the opposite portions of said member to the respective coupling halves whereby upon the angular displacement of such coupling halves the loop-shaped portion is subjected to torsional stress while transmitting rotational forces from one coupling half to the other, said loop-shaped portion having its greatest torsional stress at its middle portion and said middle portion being substantially free from bending moments under stresses due to the relative angular displacement of said coupling halves.

9. A resilient coupling element, comprising a portion in the form of an open loop of resilient material of circular shape graded in cross section to form a maximum cross section at the center of the medium portion of the loop subjected to torsional strain to a minimum cross section adjacent the ends thereof to provide substantially uniform torsional stress throughout the member, said ends of the loop having cylindrical bearing portions disposed in the plane of the loop and adapted to be pivotally mounted to support the body portion and to turn on their axes whereby to convert relatively lateral strains on the said ends to a torsional stress in the body loop.

10. A resilient coupling, comprising a pair of coupling members in spaced alinement with each other and having coupling element supporting means, a plurality of coupling elements each in the form of an open loop having a circular cross section and having rotary terminal bearing portions engaged in substantially axially alined sockets in the coupling members, said rotary terminal bearing portions being bent in opposite directions and disposed parallel with the axis of the coupling members and said bent terminal portions being rotatably disposed in said sockets, the loop portions of said resilient coupling elements bridging the axle space between the coupling members.

ALBRECHT MAURER.